United States Patent [19]

Liu

[11] Patent Number: 4,681,803

[45] Date of Patent: Jul. 21, 1987

[54] PIGMENTED, HEAT-SEALABLE COATING COMPOSITION FOR APPLICATION TO ORIENTED POLYOLEFIN FILMS

[75] Inventor: Leland L. Liu, Macedon, N.Y.

[73] Assignee: Mobil Oil Corporation, New York, N.Y.

[21] Appl. No.: 789,284

[22] Filed: Oct. 18, 1985

[51] Int. Cl.$^4$ .............................. C09J 7/02; B32B 9/04; B32B 27/08

[52] U.S. Cl. ..................................... 428/348; 106/272; 428/317.9; 428/349; 428/484; 428/515; 428/516; 428/518; 524/277

[58] Field of Search ............ 428/348, 484, 349, 314.8, 428/414, 317.9, 515, 516, 518; 524/277; 106/272

[56] References Cited

U.S. PATENT DOCUMENTS

| | | | |
|---|---|---|---|
| 2,350,292 | 5/1944 | Sermattel et al. | 428/348 |
| 2,711,996 | 6/1955 | Hofrichter | 524/277 |
| 2,898,237 | 8/1959 | Sapper | 428/348 |
| 3,695,923 | 10/1972 | Thompson et al. | 428/348 |
| 4,175,977 | 11/1979 | Heaton et al. | 106/272 |
| 4,214,039 | 7/1980 | Steiner et al. | 428/414 |
| 4,377,616 | 3/1983 | Ashcraft et al. | 428/314.8 |
| 4,447,494 | 5/1984 | Wagner, Jr. et al. | 428/349 |

Primary Examiner—Thomas J. Herbert
Attorney, Agent, or Firm—Alexander J. McKillop; Michael G. Gilman; James P. O'Sullivan, Sr.

[57] ABSTRACT

A pigmented, heat-sealable coating composition for application to a primer-coated, oriented mono-layer or multilayer polyolefin film is provided which comprises a blend of (a) a binding and oxygen barrier effective amount of a heat-sealable polyvinylidene chloride homopolymer and/or polyvinylidene chloride copolymer containing at least about 50 weight percent copolymerized vinylidene chloride, (b) an amount of wax sufficient to result in a significant reduction in the coefficient of friction of a film to which the coating composition is applied and (c) an amount of pigment sufficient to result in a significant reduction in the light transmission property of a film to which the coating composition is applied.

Oriented polyolefin films coated with the foregoing compositions possess excellent seal strength and hot tack properties, good blocking resistance, low coefficient of friction, low oxygen transmission rate and low light transmission.

10 Claims, No Drawings

PIGMENTED, HEAT-SEALABLE COATING COMPOSITION FOR APPLICATION TO ORIENTED POLYOLEFIN FILMS

BACKGROUND OF THE INVENTION

This invention relates to the field of polymer film coating compositions and, in particular, to pigmented, heat-sealable coating compositions for application to oriented mono- and multi-layer polyolefin films and to the oriented films coated with such compositions.

A variety of heat-sealable coating compositions for sheets and films are known. U.S. Pat. No. 2,350,292 describes a heat-sealable coating composition for cellulosic sheet such as glassine paper or cellophane which is compounded by dissolving at elevated temperature a cellulose ether, e.g., ethyl cellulose, a moistureproofing wax, e.g., spermaceti, a hard wax, e.g., carnauba wax, and/or a resin, e.g., an ester gum, in a solvent in an organic solvent. The coating composition can also contain finely divided powders of talc, magnesium carbonate, calcium carbonate, calcium sulfate, etc., dyestuffs, coloring matter, and the like.

U.S. Pat. No. 2,711,996 describes a heat-sealable film coating composition containing a vinylidene chloride copolymer, an ester wax slip agent, e.g., carnauba wax, a long chain aliphatic compound and finely divided calcium carbonate.

U.S. Pat. No. 2,898,237 describes a heat-sealable aqueous dispersion coating composition for polyethylene terephthalate packaging film containing a major amount of an ABS terpolymer and a minor amount of at least one of polyvinyl chloride, ammonium rosinate and a paraffin or micro-crystalline wax.

U.S. Pat. No. 3,695,923 describes an oriented, polymer film, e.g., one of polypropylene, having on at least one side thereof a primer coating based on an acrylate interpolymer and a mixture of carnauba wax and stearic acid and, applied to the primer coating, a moisture-vapor and gas barrier heat-sealable coating containing vinylidene chloride polymer/copolymer, clay and a wax such as carnauba wax.

U.S. Pat. No. 4,175,977 describes a pigmented thermoplastic hot-melt coating composition for application to cellulosic substrates. The coating composition contains a major amount of a pigment such as titanium dioxide, calcium carbonate, clays, zinc oxide, antimony oxide, talc, silica, or mixtures thereof, and a minor amount of a thermoplastic binder such as polyethylene, ethylene-vinyl acetate copolymers, ethylene-organic acid copolymers, ethylene-vinyl acetate-organic acid terpolymers, polypropylene, polystyrene, polyamides, paraffin wax, microcrystalline wax, polyterpene resins, and mixtures thereof.

U.S. Pat. No. 4,214,039 describes a packaging film structure comprising a polypropylene film substrate having a heat sealable vinylidene chloride polymer. Intermediate the polypropylene film and the vinylidene chloride polymer is a primer coat which consists of the reaction product of an acidified aminoethylated vinyl polymer and an epoxy resin. This primer coat significantly enhances the bond strength between the polypropylene and the heat sealable vinylidene chloride polymer.

U.S. Pat. No. 4,447,494 discloses an oriented multi-layer heat-sealable film structure which comprises (a) a polyolefin film substrate, e.g., polyethylene, polypropylene, polybutene, copolymers and blends thereof, and preferably, an isotactic polypropylene, coated on at least one side thereof with (b) a layer of a random copolymer of ethylene and propylene, (c) a primer layer on the random copolymer layer and (d) a heat-sealable vinylidene chloride polymer latex top coating on the primer layer.

SUMMARY OF THE INVENTION

In accordance with the present invention, a pigmented, heat-sealable coating composition for application to a primer-coated, oriented mono-layer or multi-layer polyolefin film is provided which comprises a blend of (a) a binding and oxygen barrier effective amount of a heat-sealable polyvinylidene chloride homopolymer and/or polyvinylidene chloride copolymer containing at least about 50 weight percent copolymerized vinylidene chloride, (b) an amount of wax sufficient to result in a significant reduction in the coefficient of friction of a film to which the coating composition is applied and (c) an amount of pigment sufficient to result in a significant reduction in the light transmission property of a film to which the coated composition is applied.

Oriented polyolefin films coated with the foregoing composition possess excellent seal strength and hot tack properties, good blocking resistance, low coefficient of friction, low oxygen transmission rate and low light transmission. Thus, e.g., an oriented polypropylene film coated with a composition of this invention will demonstrate a seal strength of from about 300 to about 600 g/in, a hot tack property of from about 100 to about 200 g/in, a blocking resistance of less than about 50 g/in, a coefficient of friction (COF) of less than about 0.3, an oxygen transmission rate less than about 100 $cc/in^2/24$ hr. and a light transmission of less than about 10%.

DESCRIPTION OF THE PREFERRED EMBODIMENTS

The heat-sealable polyvinylidene chloride copolymer component (a) of the present coating composition possesses a copolymerized vinylidene chloride content of at least about 50% by weight and preferably from about 75% to about 92% by weight, the balance of the copolymer being derived from other ethylenically unsaturated comonomers such as the alpha, beta ethylenically unsaturated acids, e.g., acrylic and methacrylic acids; alkyl esters containing 1–18 carbon atoms of said acids, e.g., methylmethacrylate, ethyl acrylate, butyl acrylate, etc; the alpha, beta ethylenically unsaturated nitriles, e.g., acrylonitrile and methacrylonitrile; monovinyl aromatic compounds, e.g., styrene and vinyl chloride, and so forth. The vinylidene chloride homopolymer and/or copolymer is preferably provided in the form of an aqueous latex, usually with a solids content of at least about 20 weight percent, representative ones of which are commercially available.

Specific vinylidene chloride copolymer latexes contemplated herein can comprise, e.g., 82% by weight vinylidene chloride, 14% by weight ethyl acrylate and 4% by weight acrylic acid or 78% by weight vinylidene chloride, 19% by weight methyl acrylate and 3% by weight methacrylic acid.

The minimum amount of heat-sealable polyvinylidene chloride homopolymer and/or copolymer employed in the coating composition of this invention will be that which accomplishes the binding of the remaining components of the coating composition and at the same time significantly reduces the oxygen transmission rate of the film to which the coating composition is applied, e.g., below 10cc/100 in$^2$ per 24 hours. In general, the amount of polyvinylidene chloride homopolymer and/or copolymer required to do this will vary from about 50 to about 90 weight percent of the total weight of coating composition with from about 70 to about 80 weight percent of this component being preferred.

The term "wax" as applied to component (b) of the coating composition herein refers to any one or combination of viscous-to-solid substances melting within a range of from about 50° C. to about 325° C., and preferably from about 90° C. to about 150° C., having a characteristic waxy luster, and being of natural or synthetic origin or derived from natural or synthetic materials, which have heretofore been employed in the formulation of heat-sealable coating compositions. Such waxes include, but are not limited to, (a) the vegetable waxes, e.g., carnauba which is preferred, quericury, palm, raffia, cocoa, candelilla, rhimba, ocoxilla, banana, esparto, flax, hemp, cottonseed, kapok, sugar cane, banaboo leaf, bayberry, ucuhuba, japan, cocoa butter, fiber, reed, ocuba, godang, blanophore waxes, etc.; (b) the animal waxes, e.g., lanolin, spermaceti, beeswax, stearic acid, Chinese insect wax, shellac wax, etc.; (c) the mineral waxes, e.g., ozokerite, Montan, Utah, paraffin, ceresin, microcrystalline, petrolatum, etc.; (d) the artificial waxes including those obtained from the distillation of paraffin base petroleum, ozokerite, and from the destruction distillation of lignite and parafinaceous shales, e.g., peat wax, and the like; (e) the synthetic and manufactured waxes which include the fatty alcohols, e.g., cetyl alcohol, stearyl alcohol and other alcohols derived from fatty acids, and the like; esters of higher alcohols and fatty acids including esters of cetyl alcohol, stearyl alcohol, and the like, with stearic acid, palmitic acid, and the like; fatty acids including stearic, palmitic, myristic, and other fatty acids derived from tallow, cottonseed oil, coconut oil and soybean oil; glycerol esters such as glycerol tri-stearate, glycol distearate and glycerol monostearate, and the like; the mono- and di- fatty acid esters of glycols such as ethylene glycol mono- and di-stearate, diethylene glycol mono- and di-palmitate, propylene glycol monoand di-stearate, the sorbitol stearates, the pentaerythritol stearates, the polypentaerythritol fatty acid esters, and the like; hydrogenated and partially hydrogenated fatty oils such as cottonseed, coconut, peanut, soybean, castor, fish, whale and other vegetable and/or animal oils, and the like; the polyglycols generally having a molecular weight greater than about 500 (e.g. the Carbowaxes), and the like; the chlorinated naphthalenes, and the like; complex nitrogen derivatives of higher fatty acids, and the like; glycerine and glycol esters of acids derived from Montan wax, and the like; waxy ketones, amines, amides and nitriles such as 16-hentriacontanone, octadecyl-hexadecyl amine, higher molecular weight aliphatic amides, octadecanamide, hexadecanamide, octadecane nitrile, hexadecane nitrile, and the like; solid hydrocarbons with melting points up to 210° C., e.g., polyethylene wax, and wax-like polymerization products of one or more alpha-olefins, and the like; oxidized paraffin or microcrystalline waxes, and the like; and mixtures of two or more of the foregoing.

The wax functions in the coating composition to impart anti-blocking properties and to reduce the coefficient of friction (COF) of the film to which the coating composition is applied. Reductions in COF to about 0.3 or less are desirable. To accomplish these objectives, only a minor amount of wax, generally on the order of from about 1.5 to about 10 weight percent, and preferably from about 3 to about 6 weight percent, by total weight of coating composition need be employed for good results.

Illustrative of the pigment component (c) of the present coating compositions are inorganic powders such as titanium dioxide, calcium carbonate, clays, zinc oxide, antimony oxide, carbon black, iron oxides, etc., and organic powders such as the azo pigments, e.g., toluidine red and para reds; the triphenylmethane pigments, e.g., malachite green; the xanthene pigments, e.g., the rhodamines; the thiazole pigments; the quinoline pigments; the anthraquinone pigments; the phythalocyanines, etc. The pigment component is employed at a level sufficient to provide significantly reduced light transmission, e.g., below about 30% and will generally be present at a level of from about 8 to about 40 weight percent, and preferably from about 15 to about 25 weight percent, by total weight of coating composition.

In addition to the foregoing ingredients, the coating composition of this invention can contain other materials commonly included in heat-sealable compositions such as slip agents, antioxidants, organic and inorganic coloring matter, metal powders, and the like, in the usual amounts.

Blending of the foregoing materials to provide the coating compositions herein can be readily accomplished with conventional equipment using conventional techniques. Thus, blending can be effected by simultaneously combining the entire amount of all the components, with or without heat and with or without solvent(s) and/or dispersing agent(s), in a suitable mixing device, e.g., a double-arm, kneader-type batch mixer, for such a time until a substantially homogeneous mass is obtained. Blending can also be carried out in stages with a concentrate of two or more components e.g., wax, pigment and/or optional ingredients, first being obtained followed by addition of the polyvinylidene chloride homopolymer/copolymer component. Variations of these and similar blending methods can, of course, also be used.

The polyolefins contemplated as the substrate layer, or in the case of a multi-layer film, as the skin or surface layer, of the oriented films to which the foregoing coating compositions are to be applied include polyethylene, polypropylene, polybutene and copolymers and blends thereof. Particularly preferred is an isotactic polypropylene containing at least 80% by weight of isotactic polypropylene. It is preferred that the polypropylene have a melt flow index of from about 4 to 8 g/10 minutes. One or both sides of a film formed from these and similar polyolefin materials can be provided by coextrusion or other known method with one or more films of a different composition than the base, or core, film. An especially preferred multi-layer, composite or laminate film for use in the practice of this invention is the opaque, biaxially oriented polymer film structure disclosed in U.S. Pat. No. 4,377,616, the contents of which are incorporated by reference herein. The oriented film structure of this patent is fabricated from:

(a) a thermoplastic polymer matrix core layer, preferably formed from an isotactic polypropylene, having an upper and lower surface and within which is located a strata of voids; positioned at least substantially within at least a substantial number of voids is at least one void-initiating, preferably spherical, particle which is phase distinct and incompatible with the matrix material, e.g., a solid or hollow microspherical particle formed from an organic material such as a polyamide (nylon), certain polyesters such as the polyethylene terephthalate acetals, an acrylic resin, etc., and/or an inorganic material such as glass, metal, ceramic, etc., the void space occupied by said particle being substantially less than the volume of said void, with one generally cross-sectional dimension of said particle at least approximating a corresponding cross-sectional dimension of said void; and, (b) a void-free thermoplastic skin layer, also preferably formed from an isotactic polypropylene, affixed to each of the upper and lower surfaces of core layer (a).

The oriented film structure of U.S. Pat. No. 4,377,616 is prepared by:

(a) mixing a first thermoplastic polymeric material, e.g., isotactic polypropylene, with void-initiating particles, e.g., those derived from nylon;

(b) heating the core mixture to a temperature at least above the melting point of the material constituting the void-initiating particles;

(c) dispersing the void-initiating particles substantially uniformly throughout the molten first material;

(d) extruding the core mixture to provide a core layer;

(e) adherently applying, preferably by coextrusion, a thermoplastic skin layer, e.g., of isotactic polypropylene, to each of the upper and lower surfaces of said core layer; and, (f) biaxially orienting the film structure at a temperature and to an extent to form opacifying voids in said core layer so as to optimize the degree of opacity of the film, enhance its physical characteristics and impart a lustrous satin appearance thereto.

The surface(s) of the oriented film which is to receive the coating composition of this invention prior to the deposition of the latter can, if desired, be given a pre-treatment to improve wet-out of the subsequently applied coating, e.g., pre-treatment by corona discharge, flame or oxidizing chemicals, the operational parameters of which are well known in the art.

Since the coating composition of this invention will not adhere well to polyolefin film, and particularly to the preferred isotactic polypropylene mono-layer and multi-layer films described above, it is necessary to apply a primer to the surface(s) of the film to be coated prior to application of the coating formulation. The primer functions to improve the adhesion of the coating composition to the film surface(s) to which it is applied. The primer materials contemplated for enhancing the bond between the coating composition and the underlying resin surface(s) include the reaction product of an epoxy resin and an acidified aminoethylated vinyl polymer. The contemplated epoxy resins are glycidyl ethers of polyhydroxy compounds. Typical polyhydroxy compounds which can be used include bisphenol A, ring substituted bisphenol A, resorcinol, hydroquinone, phenol-formaldehyde novolac resins, aliphatic diols such as ethylene glycol, propylene glycol, 1,4-butanediol, 1,6-hexanediol, glycerol, lower alkyl hydantoins and mixtures thereof. The preferred epoxy resins are those prepared by the glycidation reaction between epichlorohydrin and bisphenol A. Epoxy resins of this type are commonly classified by their epoxy equivalent weight (EEW) which is defined as the weight of resin in grams which contains one gram equivalent of epoxy groups. Resins with an EEW ranging from 170 to 280 can be used in the present invention, but the preferred range is 180 to 210.

A variation in the composition of the epoxy resin component is one in which a hydantoin compound is substituted for the bisphenol A. For example, 1,1-dimethyl hydantoin can be employed in a low molecular weight epoxy resin since resins based on this material are completely water soluble thereby eliminating the necessity for emulsification.

Although the specific structure of the epox resin is not critical to the primer employed in the present invention, important considerations in the selection of the epoxy resin revolve around its physical state. For example, it must be liquid and capable of being readily dispersed or dissolved with the second component or curing agent as described hereinbelow. If the epoxy resin is of low viscosity, it may be stirred directly into the second component, i.e., curing agent, however, it is preferred to employ the epoxy resin in an aqueous emulsion.

The second component in the epoxy primer is an amino modified acrylic polymer which is water soluble. This polymer is a curing agent for the epoxy compound. The preferred material is described in U.S. Pat. No. 3,719,629, the disclosure of which is incorporated herein by reference, and may be generically described as an acidified aminoethylated interpolymer having pendant aminoalkylate groups. This material is produced by polymerizing acrylate, methacrylate, styrene or other suitable monomers with sufficient methacrylic or acrylic acid to give a —COOH content of about 7.5 to about 12.5%. Solvent polymerization techniques are preferred. The polymer is then reacted with ethyleneimine monomer and acidified with hydrochloric acid to render the polymer water soluble.

The primer coating can be applied to the film substrate as a dispersion or as a solution, from an organic vehicle, for example, an alcohol or an aromatic hydrocarbon, such as xylene or a mixture thereof.

In one embodiment of the present invention, a liquid epoxy resin is emulsified in a solution of the curing agent by rapid stirring, the resultant dispersion is diluted with water to the desired concentration for coating, usually from about 2 to about 25% solids.

When mixing the epoxy resin with the curing agent, it is generally preferred to use a stoichiometric equivalent balance of epoxy and amine groups. However, the stoichiometric ratio can be varied over a wide range, from about one epoxy group to about three amine groups through three epoxy groups to one amine group, and preferably from about one epoxy group to two amine groups through about two epoxy groups to about one epoxy group, without seriously effecting the product's usefulness as a primer coating.

It is to be understood that the solution or dispersion of epoxy resin and curing agent can contain small amounts of wetting agents in order to facilitate the application of the primer material to the film surface. Conventional prior art nonionic wetting agent which can be employed include the hexyl or benzyl ether of ethylene glycol, the hexyl ether of diethylene glycol, butyl alcohol, hexyl alcohol, octyl alcohol, diacetone alcohol, and the like.

Although mixtures of the epoxy resin and the curing agents will cross-link or cure without the necessary addition of a catalyst, it has been found advantageous in certain instances to use an amine catalyst. Such catalysts include propylene diamine, hexamethylene diamine, etc.

Other operable primer compositions include those described in British Pat. No. 1,134,876 which discloses a primer produced by condensing a monoaldehyde with an interpolymer of acrylamide or methacrylamide and at least one other unsaturated monomer. British Pat. No. 1,174,328 discloses a material which has utility as a primer in the present invention which is the product resulting from condensing aminoaldehyde with acrylamide or methacrylamide and subsequently interpolymerizing the condensation product with at least one other unsaturated monomer in the presence of a $C_1$-$C_6$ alkanol. A preferred primer coating resin of this type comprises a copolymer containing up to 90% by weight of styrene, up to 80% by weight of an alkyl acrylate, up to 15% by weight of methacrylic acid and 5% to 25% by weight of acrylamide which as been condensed with a solution of formaldehyde in n-butanol containing from 0.2 to 3 equivalents of formaldehyde for each amide group in the copolymer. A particularly preferred primer resin is a 50% solids solution of a copolymer resin containing 38.5 parts of styrene, 44 parts of ethyl acrylate, 2.5 parts of methacrylic acid and 15 parts of acrylamide which has been condensed with 5.2 parts of formaldehyde in n-butanol.

The primer dispersion, to be applied to the surface(s) of the polyolefin film can have a solids concentration of from about 5% up to about 25%.

The primer dispersion can be applied to the surface(s) of the film utilizing standard coating techniques so that a dry coating weight of from about 0.05 up to about 0.25 gram/1,000 square inches of film is obtained. The thus coated film can be subsequently passed through a hot air oven to completely remove water and solvent.

Following application of the primer of the film, the coating composition is applied to the primer-treated surface(s) using standard coating techniques such as graveur, roll coating, and the like.

The amount of coating composition applied to the substrate film can be varied over a wide range depending upon the specific properties desired in the final film product. Coating weights of from about 1 to about 6 grams per 1,000 square inches can be employed.

The following examples are further illustrative of the pigmented, heat-sealable coating compositions of this invention and oriented polyolefin films coated therewith.

EXAMPLES 1-4

A. Base Film Preparation

A mixture of isotactic polypropylene (93 parts, MP, 160° C. and a melt index of 4.5) and nylon-6 (7 parts, MP 225° C.) is melted in an extruder provided with a screw of L/D ratio of 20/1. A second extruder is provided in association with this first mentioned extruder and supplied with the same polypropylene but without the nylon-6 present. A melt coextrusion is carried out while maintaining the cylinder of the core material at a temperature ranging from 190° C. to 260° C. The polypropylene to be extruded as the skin layers is maintained at a temperature of 250° C. A film structure is coextruded with a core thickness 70% of the total extruded thickness. The skin layers are each approximately 15% of the total thickness. The unoriented film measures approximately 40 mils in thickness. This sheet is substantially oriented seven by seven and one-half times using a commercially available sequential biaxially oriented apparatus. The MD orientation temperature is about 130° C. and the TD orientation about 175° C. The film is then given a conventional pre-treatment by corona discharge. The resulting film structure possesses a lustrous satin appearance.

B. Application of Primer to the Base Film

The corona discharge-treated, opaque oriented polypropylene film laminate described above was coated on its upper surface with the primer reaction product of the acidified aminoethylated vinyl polymer and epoxy resin of Example 5 of U.S. Pat. No. 4,214,039, the contents of which are incorporated by reference herein. The primer coated film was then cured at about 120° C. for 10 seconds.

C. Preparation of Pigmented, Heat-Sealable Coating Composition

The following coating formulations were prepared:

| Example | polyvinylidene chloride copolymer[1] | wax[2] | pigment[3] | slip agent[4] (optional) |
|---|---|---|---|---|
| 1A | 86.6 | 4.3 | 8.7 | 0.4 |
| 1B | 79.7 | 4.0 | 15.9 | 0.4 |
| 1C | 73.8 | 3.7 | 22.1 | 0.4 |
| 1D | 68.7 | 3.4 | 27.5 | 0.3 |
| 2A | 86.6 | 4.3 | 8.7 | 0.4 |
| 2B | 79.7 | 4.0 | 15.9 | 0.4 |
| 2C | 73.8 | 3.7 | 22.1 | 0.4 |
| 3A | 86.6 | 4.3 | 8.7 | 0.4 |
| 3B | 79.7 | 4.0 | 15.9 | 0.4 |
| 3C | 73.8 | 3.7 | 22.1 | 0.4 |
| 3D | 68.7 | 3.4 | 27.5 | 0.3 |
| 4A | 86.6 | 4.3 | 8.7 | 0.4 |
| 4B | 79.7 | 4.0 | 15.9 | 0.4 |
| 4C | 73.8 | 3.7 | 22.1 | 0.4 |
| 4D | 68.7 | 3.4 | 27.5 | 0.3 |

Component (weight percent of total coating composition)

[1] Aqueous polyvinylidene chloride copolymer latex containing 40 weight percent solids in which the copolymer contains about 80 weight percent copolymerized vinylidene chloride with copolymerized methyl methacrylate, methyl acrylate and methacrylic acid constituting the balance of the copolymer.
[2] Carnauba wax.
[3] Example 1: ferric oxide (chocolate I).
Example 2: ferric oxide (chocolate II).
Example 3: ferric oxide (red)
Example 4: titanium dioxide (white).
[4] Talc.

D. Application of Coating Composition to Primer-Treated Base Film

The foregoing coating compositions were applied to individual sections of the primer-coated surface of the base film and the properties of the coated film sections with their varying amounts of pigment were measured, the observed values being set forth below as follows:

| Example | Minimum Seal Temp. (°F.) | Seal Strength 250–290° F. In/Ret. (g/in) | Blocking (g/in) | COF | Light Trans (%) | Hot Tack @ 260° F. (g/in.) | Coat. Wt. (g/1000 in²) | Oxy Trans (cc/100 in²/24 hrs) |
|---|---|---|---|---|---|---|---|---|
| 1A | 219 | 595/518 | 2.5 | 0.15 | 18.6 | 173 | 3.69 | 4.17 |

-continued

| Example | Minimum Seal Temp. (°F.) | Seal Strength 250-290° F. In/Ret. (g/in) | Blocking (g/in) | COF | Light Trans (%) | Hot Tack @ 260° F. (g/in.) | Coat. Wt. (g/1000 in²) | Oxy Trans (cc/100 in²/24 hrs) |
|---|---|---|---|---|---|---|---|---|
| 1B | 217 | 513/515 | 6.8 | 0.17 | 13.1 | 173 | 3.76 | 5.10 |
| 1C | 217 | 497/463 | 10.2 | 0.22 | 11.6 | 173 | 3.78 | 6.45 |
| 1D | 218 | 438/240 | 13.0 | 0.25 | 9.9 | 173 | 3.72 | 6.16 |
| 2A | 221 | 542/523 | 2.6 | 0.15 | 20.5 | 173 | 3.63 | 4.02 |
| 2B | 217 | 500/459 | 5.8 | 0.18 | 16.2 | 173 | 3.60 | 4.85 |
| 2C | 220 | 448/360 | 6.4 | 0.24 | 12.5 | 173 | 3.59 | 6.08 |
| 3A | 220 | 502/470 | 3.4 | 0.15 | 12.1 | 173 | 3.63 | 4.39 |
| 3B | 217 | 547/413 | 12.4 | 0.22 | 6.1 | 173 | 3.85 | 5.55 |
| 3C | 214 | 375/297 | 59.9 | 0.29 | 3.8 | 173 | 3.95 | 7.71 |
| 3D | 212 | 340/210 | 149.0 | 0.29 | 2.7 | 173 | 4.01 | 7.80 |
| 4A | 217 | 523/487 | 13.5 | 0.16 | 27.7 | 173 | 3.87 | 3.39 |
| 4B | 217 | 521/502 | 17.4 | 0.17 | 25.3 | 173 | 3.87 | 4.00 |
| 4C | 218 | 458/455 | 20.3 | 0.16 | 24.7 | 173 | 3.91 | 4.59 |
| 4D | 219 | 471/415 | 31.7 | 0.15 | 23.2 | 173 | 3.96 | 5.16 |

What is claimed is:

1. A pigmented heat-sealable coating composition for application to a primer-coated, oriented mono-layer or multi-layer polyolefin film which comprises a blend of (a) a binding and oxygen barrier heat-sealable polyvinylidene chloride homopolymer and/or polyvinylidene chloride copolymer, at a level of from about 50 to about 90 weight percent of the coating composition, containing at least about 50 weight percent copolymerized vinylidene chloride, (b) wax at a level of from about 1.5 to about 10 weight percent of the coating composition, to thereby result in a significant reduction in the coefficient of friction of a film to which the coating composition is applied and (c) pigment at a level of from about 15 to about 25 weight percent of the coating composition.

2. A mono-layer or multi-layer oriented polyolefin film having at least one exposed surface thereof coated with a primer, said primer-coated surface being coated with a coating composition of claim 1.

3. The oriented film of claim 2 formed from isotactic polypropylene.

4. The coating composition of claim 1 wherein polyvinylidene choloride copolymer component (a) contains from about 75% to about 92% by weight of copolymerized vinylidene chloride.

5. The coating composition of claim 1 wherein the polyvinylidene chloride homopolymer and/or copolymer component (a) is present at a level of from about 70 to about 80 percent by weight thereof.

6. The coating composition of claim 1 wherein wax component (b) is selected from the group consisting of vegetable wax, animal wax, mineral wax, artificial wax, synthetic wax and manufactured wax.

7. The coating composition of claim 1 wherein wax component (b) is carnauba wax.

8. The coating composition of claim 1 wherein polyvinylidene choloride homopolymer and/or copolymer component (a) is provided as a latex.

9. The coating composition of claim 1 wherein pigment component (c) is an inorganic material selected from the group consisting of titanium dioxide, calcium carbonate, clays, zinc oxide, antimony oxide, carbon black and iron oxides.

10. The coating composition of claim 1 wherein pigment component (c) is an organic material selected from the group consisting of toluidine red, para red, triphenylmethane pigment, xanthene pigment, thiazole pigment, quinoline pigment, anthraquinone pigment and phythalocyanine pigment.

* * * * *